W. G. DODD.
PISTON PACKING RING.
APPLICATION FILED SEPT. 3, 1912.

1,064,300.

Patented June 10, 1913.

2 SHEETS—SHEET 1.

Witnesses
A. B. Craig.
F. F. Alexander.

Inventor
W. G. Dodd.

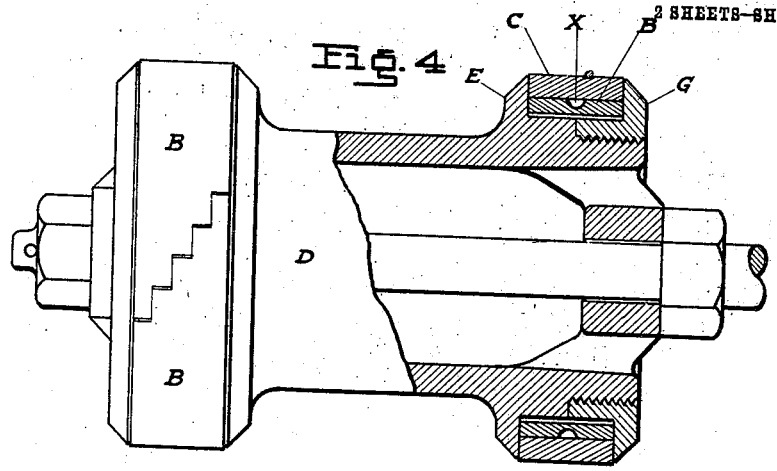
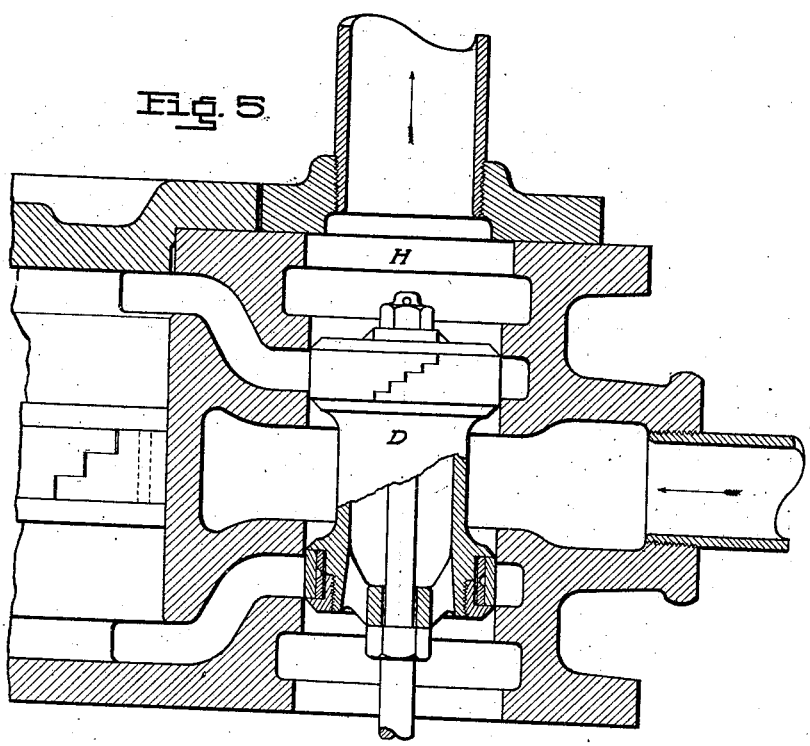

UNITED STATES PATENT OFFICE.

WILLIS G. DODD, OF SAN FRANCISCO, CALIFORNIA.

PISTON PACKING-RING.

1,064,300.　　　Specification of Letters Patent.　　Patented June 10, 1913.

Application filed September 3, 1912. Serial No. 718,339.

*To all whom it may concern:*

Be it known that I, WILLIS G. DODD, of San Francisco, California, have invented certain new and useful Improvements in Piston Packing-Rings, whereof the following is a specification.

My invention relates to packing rings, more particularly as applied to pistons and piston valves.

The main object of the invention is to construct an efficient, strong, safe and durable piston packing ring, adapted to operate under the highest attainable pressures and temperatures of superheated steam.

A further object is to construct a piston packing ring, adapted to operate under expansive tension, or contractive tension as desired, or as conditions may require.

A further object is to construct a piston packing ring, to meet the conditions required, with the smallest possible number of joints and parts therein.

The means employed for accomplishing these objects are described in the following specification, pointed out in the claims and illustrated in the accompanying drawings, similar letters and numerals referring to similar parts.

Merely for the purpose of illustration, a form of piston valve is shown in the accompanying drawings to which this invention is applicable, but it may be applied to other types and for other purposes, and no limitation with respect to the scope of the invention is implied by reason of the particular form of its application herein shown and described.

Figure 1:
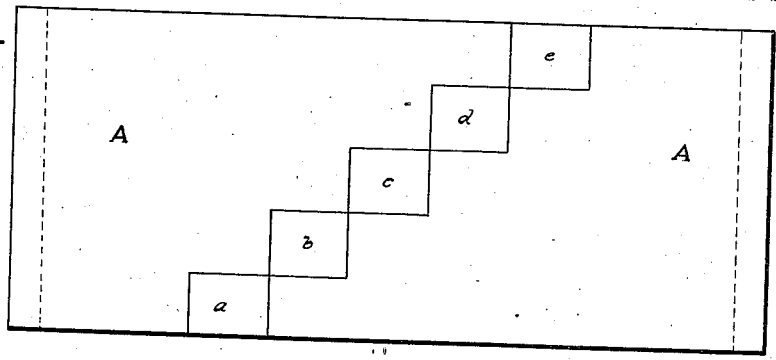
Figure 2:
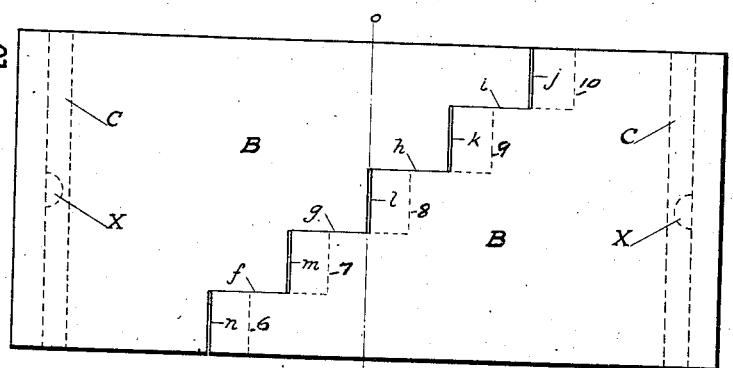
Figure 3:
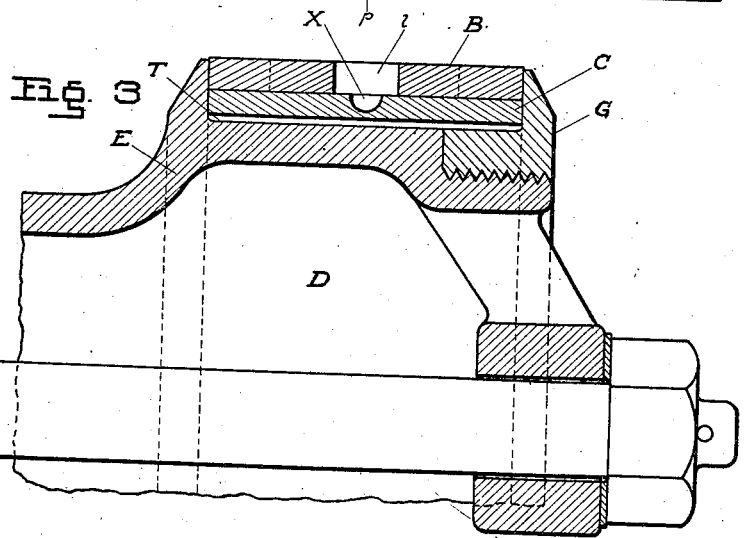

In the drawings:—Figure 1 is an elevated view of a solid metal ring, dotted lines indicating proportionate thickness of the metal and diagonal line of squares indicating metal to be, or as cut away. Fig. 2 is an elevation of the ring shown in Fig. 1 after it has been compressed and set, and shows the steam abutments which have been formed by the process, the inside dotted line representing a bull-ring. Fig. 3 is a sectional view of a portion of the head of a piston valve, and shows the relative position of the packing as applied to a piston valve. Fig. 4 is a view of a piston valve in part section fitted with my improved packing. Fig. 5 is a sectional illustrative view of a steam cylinder and valve chest, with piston and valve fitted with my improved packing, in operating position.

In the figures and letters of reference:—

A. is a solid turned metal ring of any diameter, width and thickness required.

*a. b. c. d. e*, represent portions of the ring cut away or mortised out of the solid metal.

B. represents the ring A after it has been compressed and set, and by so doing has formed the steam tight joints or abutments *f. g. h. i.* and leaving the spaces or openings *j. k. l. m. n.*

C. represents a metal bull-ring of the ordinary type and proportions, (with reference to the outside ring) which when cut and inserted within the ring B has an expansive tension.

D. represents a portion of the head of a piston valve of the ordinary type.

E. represents the fixed flange and G represents the removable flange, and between these two flanges the packing ring B and bull-ring C are shown in relative and normal position.

X represents a grove or port, formed in the outside of the bull-ring C and is shown in communication with the opening 1 on line *o. p.* Fig. 2 of the packing ring B.

T. represents an annular opening or space between the valve head and the bull-ring.

The method of constructing a packing ring as herein disclosed is as follows:—First turn, bore and face the metal ring to the approximate size required, cut or mortise out the sections *a. b. c. d. e.*, then heat the ring to a cherry red heat, and press it into a metal mold of proper depth, having an internal diameter of about one eighth of an inch less than the external diameter of the ring, let it remain until cold, then remove it and repeat the process, (each operation requiring a smaller mold) as many times as necessary to form abutments *f. g. h. i.*, the ends of the ring at *j.* and *n.* may now be secured by use of soft solder, and the ring treated as a solid casting, turned, bored and faced to the finished size.

In the drawings Fig. 2, the ring B is shown as formed for a contractive tension, and requires a substantial bull-ring with an expansive tension or some other controllable means suitable for expanding the packing ring out to the bore of the valve chamber.

Should it be desirable to have the packing ring operate under an expansive tension, the process of compressing the ring is not carried as far as when required for a contractive tension, but would stop when it substantially reached a point indicated by the dotted lines, 6. 7. 8. 9. 10. Fig. 2. The ring would now be sprung together, fastened with soft solder and treated as a solid casting, and be turned, bored and faced to size, and a light bull-ring with very little expansive tension would be employed.

The construction as above described is preferable when the packing ring is of cast metal. If preferred the ring may be made of ductile metal, in which case spring steel is preferable, and a plate of suitable length and width is properly cut or notched at the ends, and is then rolled into a ring, the notched ends coming together and forming the lap-joints or abutments, and the ring thus formed is then treated as above described, but before being put into operation, it should be tempered in oil, to a degree of hardness, approximately that of the metal forming the bore within which it reciprocates. For use in pumps this packing ring may be, if desired, made of rubber or any suitable fiber.

In the operation of this packing ring it is desirable that it should be "balanced" that is, the pressure inside the packing should be the same as the pressure outside, and to provide for this, the grove X, is turned out in the bull-ring C. This grove communicates with the outside opening $l$ as shown on line $o$. $p$. Fig. 2; thus affording direct communication (through the inside cut of the bull-ring) to the small space between the packing and the valve head, thus providing for "pressure balance" required. Another important function is performed by this grove, viz., when steam pistons are working in connection with a vacuum it is desirable (and almost imperative) that oil should not be used for lubrication, and pistons under the conditions named operate without lubrication other than the moisture contained in the steam.

With high superheat the amount of moisture is almost negligible and the pistons receive little or no lubrication. With my steam packing, the space T between the bull-ring and valve head is partially filled with pure graphite and in operation finds its way out in minute particles through the grove in the bull-ring and thus affords the much needed lubricant.

The method of constructing a piston packing ring as herein disclosed, admits of providing a packing which meets all the conditions required for operating under the highest practical temperatures of superheat, affords perfectly steam tight abutments, may be operated under expansive or contractive tension as desired, enabling it to be fitted to the working bore at any degree of "friction pull" desired, and it can be constructed in the most substantial manner, of any material, thus insuring perfect safety in operation ashore or afloat.

Having thus described my invention, I claim:—

1. A piston packing ring, consisting of one piece of material, having a plurality of integral lap-joint or abutments.

2. A resilient piston packing ring, consisting of one piece of material having a series of lap-joints or abutments formed integral with the ring itself.

3. A piston packing ring, consisting of one piece of material provided with a plurality of integral lap-joints or abutments, in combination with a bull-ring as and for the purpose described.

In testimony that I claim the foregoing I have set my hand this 28th day of August, 1912, in the presence of witnesses.

W. G. DODD.

Witnesses:
F. F. ALEXANDER,
A. B. CRAIG.